Nov. 2, 1926.
F. H. SPEED
1,605,794
SECONDARY CELL
Filed Oct. 27, 1924
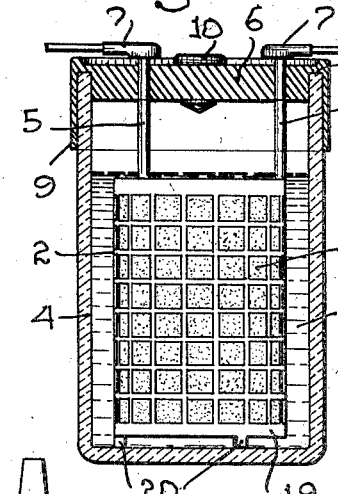
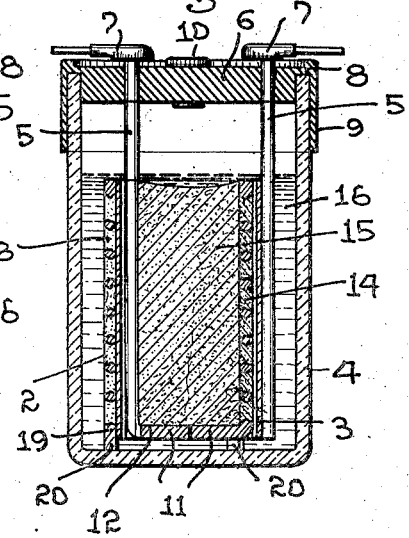
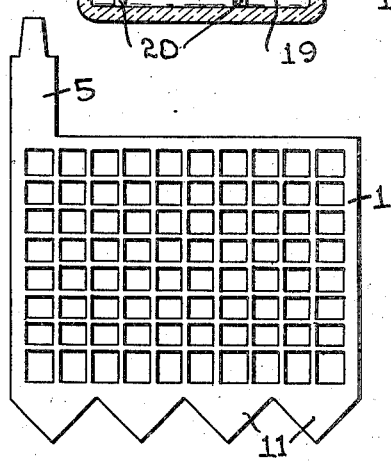
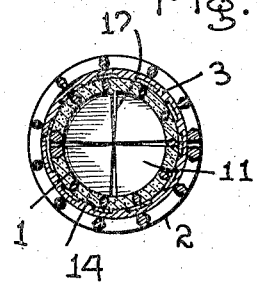
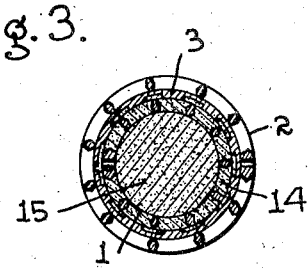
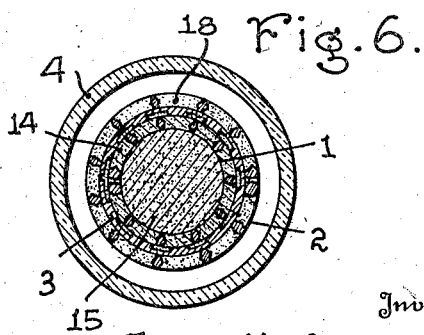
Inventor
FRED H. SPEED.

Patented Nov. 2, 1926.

1,605,794

UNITED STATES PATENT OFFICE.

FRED H. SPEED, OF BOSTON, MASSACHUSETTS, ASSIGNOR, BY MESNE ASSIGNMENTS, TO HELIOS BATTERY COMPANY, INC., OF BOSTON, MASSACHUSETTS, A CORPORATION OF MASSACHUSETTS.

SECONDARY CELL.

Application filed October 27, 1924. Serial No. 746,142.

The purpose of the invention is to modify the construction of secondary or storage cells, so that, in use, sulphation, when produced from an electrolyte of high temperature or from short circuits, may be eliminated; to provide a construction and arrangement of positive and negative elements which will preclude buckling of the elements; to arrange for the support of the active material in such a way as to preclude disintegration and shedding; and to provide a construction and arrangement of elements wherein short circuiting will be reduced to a minimum if not completely eliminated.

With these purposes in view, the invention consists in a construction and combination of parts of which a preferred embodiment is illustrated in the accompanying drawings, wherein:

Figure 1 is a view in side elevation of the assembled positive and negative elements, the container being shown in section.

Figure 2 is a view similar to Figure 1 with the exception that the elements are shown in section.

Figure 3 is a plan view of the positive element showing the latter prior to being rolled into cylindrical form.

Figure 4 is a horizontal sectional view of the assembled elements after the application of the active material in the openings of the positive element.

Figure 5 is a view similar to Figure 4 with the active material fully applied to the positive element.

Figure 6 is a view similar to Figure 5 and showing the container in section, with the active material fully applied to both elements.

The positive and negative elements 1 and 2, together with the separator 3, are assembled as a single unit for disposition in the container or jar 4, the elements being provided with extension tongues 5 passing through the cover 6 of the jar for securement in the usual way to terminals 7. The cover 6 is preferably of rubber and is channeled, as indicated at 8, to receive the upper edge of the jar, a peripheral extended lip 9 being formed with the cover and bounding the channel to encompass the jar to which the lip may be sealed in any acceptable manner. The cover 6 is provided with a plug 10 through which the electrolyte may be replenished or water added to make up for evaporation which takes place in practice.

Both the positive and negative elements are originally prepared as flat plates, as indicated in Figure 3, both having the same height but the negative plate 2 being longer than the positive plate 1 and omitting the sector-shaped leaves 11 with which the positive plate is provided and which, when the latter is rolled, are turned in, as clearly indicated in Figure 2, to provide a closed bottom wall 12 for the positive element. The plates are preferably rolled around a form of the necessary diameter and the separator likewise rolled to be positioned within the negative element, after which the positive element is inserted to occupy the desired position within the space bounded by the separator.

The application of the active material to the positive element then takes place and the paste is applied first in the grid openings, as indicated at 14, in Figure 4, preferably by smearing it in with the finger. The openings in the grid having been properly filled, the positive element is then completely filled with active material 15, thus making the positive element of cartridge form. The interior plug 15, however, is not packed compactly enough to preclude the free circulation of the electrolyte 16 but it serves nevertheless to retain the pellets 14 in the openings in the grid in position in the latter, the separator precluding their falling out from the exterior surface of the element, since the separator is in superficial contact with the positive element as well as with the inner wall of the negative element and the active material of both.

Where the leaves are turned to form the bottom 12 for the positive element, their edges are not brought into too close contact, spaces 17 being left between adjacent leaves to permit the electrolyte penetrating the positive element from the bottom.

After the positive element has been completely supplied with the active material, the application of the active material to the negative element is then effected, the paste being applied to the exterior surface of the negative element and forced into the openings in the grid of the latter. After the openings have been completely filled, the surface is wiped off, thus leaving the pellets 18 in the negative element.

It is apparent that expansion and contraction of the elements may take place due to the fact that the extremities of the plates constituting the elements are not secured together, thus allowing for diametrical expansion and contraction. Also, it is apparent that the active material is positively prevented from falling out of position on the positive element and any that may leave the negative element would drop to the bottom of the jar outside of the former and be precluded from reaching the positive element and thus short circuiting the couple by the lower marginal edge 19 of the negative element which is spaced above the bottom of the container only a sufficient distance to permit the free circulation of the electrolyte. The feet 20 formed on the lower edge of the negative element serve as a spacing means of the latter from the bottom of the container. But the negative element in a lead plate battery is not subjected to disintegration. Deterioration in a lead plate battery is due to disintegration in the positive plate and this is subjected to buckling and shedding when the battery is abused, as by a too high rate of charging, external short circuits, and a too high rate of discharge. The plugging or filling of the positive element in the present invention, however, practically precludes any shedding and the plug of active material serves as a positive means to prevent buckling, the cell having been shown, under test, to be capable of standing a dead short circuit without any deleterious effect other than requiring a slightly longer time after for recharging as might reasonably be expected. Also the plug or filler of active material in the positive plate, together with the closure at the lower end of the latter, acts as a positive means against shedding.

The invention having been described, what is claimed as new and useful is:

1. A secondary cell having positive and negative elements of cylindrical form of which the latter is in surrounding relation to the former, active material applied to both elements and arranged in cartridge form in the positive element, the said positive element having inturned leaves at its lower end constituting a closed bottom positively retaining the active material therein.

2. A secondary cell having positive and negative elements consisting of grids rolled to cylindrical form, one of said elements being disposed within the other, active material filling the openings in the grids of both members, a cylindrical separator in surrounding relation to the inner element and surrounded by the outer element and in superficial contact with the outer peripheral surface of the inner element, and a cartridge of active material filling the inner element and in superficial contact with the inner peripheral surface thereof.

3. A secondary cell having positive and negative elements consisting of grids rolled to cylindrical form, one of said elements being disposed within the other, active material filling the openings in the grids of both members, a cylindrical separator in surrounding relation to the inner element and surrounded by the outer element and in superficial contact with the inner peripheral face of the outer and the outer peripheral face of the inner elements respectively throughout the extent of the same, the active material of both elements being in contact with the separator, and a cartridge of active material filling the inner element.

4. A secondary cell having positive and negative elements consisting of grids rolled to cylindrical form, one of said elements being disposed within the other, active material filling the openings in the grids of both members, a cylindrical separator in surrounding relation to the inner element and surrounded by the outer element and in superficial contact with the inner peripheral face of the outer and the outer peripheral face of the inner elements respectively throughout the extent of the same, the active material of both elements being in contact with the separator, and a cartridge of active material filling the inner element, the latter having inturned leaves at its lower end constituting means for retaining said cartridge in place.

5. A secondary cell having positive and negative elements of tubular form of which the former is enclosed by the latter, and a separator interposed between the two and in contact with both, both elements and the separator being split in the direction of their lengths at one point on the periphery of each, and the split in each being angularly displaced with reference to the splits in the other two.

In testimony whereof he affixes his signature.

FRED H. SPEED.